United States Patent [19]

Brock

[11] Patent Number: 5,201,472
[45] Date of Patent: Apr. 13, 1993

[54] METHOD FOR PREPARING AND STORING A RECYCLABLE SHINGLE MATERIAL

[75] Inventor: J. Don Brock, Chattanooga, Tenn.

[73] Assignee: Astec Industries, Inc., Chattanooga, Tenn.

[21] Appl. No.: 902,759

[22] Filed: Jun. 23, 1992

Related U.S. Application Data

[60] Continuation of Ser. No. 737,056, Jul. 29, 1991, abandoned, which is a division of Ser. No. 606,892, Oct. 1, 1990, abandoned.

[51] Int. Cl.$^5$ ............................................. B02C 19/00
[52] U.S. Cl. .................................. 241/22; 241/101.8; 366/6
[58] Field of Search ................. 241/22, 101.8; 106/281.1; 366/8, 18, 1, 2, 6, 7, 30, 9

[56] References Cited

U.S. PATENT DOCUMENTS

| | | | |
|---|---|---|---|
| 3,825,192 | 7/1974 | Knight | 241/186 R |
| 4,210,290 | 7/1980 | Anderson et al. | 241/30 |
| 4,325,641 | 4/1982 | Babus et al. | 366/18 |
| 4,339,202 | 7/1982 | Hart et al. | 366/18 X |
| 4,627,577 | 12/1986 | Hyuga et al. | 241/30 |
| 4,706,893 | 11/1987 | Brock | 241/23 |

Primary Examiner—Mark Rosenbaum
Assistant Examiner—Frances Chin
Attorney, Agent, or Firm—Jones & Askew

[57] ABSTRACT

A method for treating asphalt roofing shingles to be used for recycling in an asphalt plant which mixes asphalt roofing shingles with between about 15% and 50% by weight of a carrier aggregate. The aggregate is fed into a shredder with the shingles or is otherwise mixed with the comminuted shingles to form a recyclable asphaltic material which may be easily stored and transported, and which may also be used in the preparation of asphalt paving composition.

10 Claims, 2 Drawing Sheets

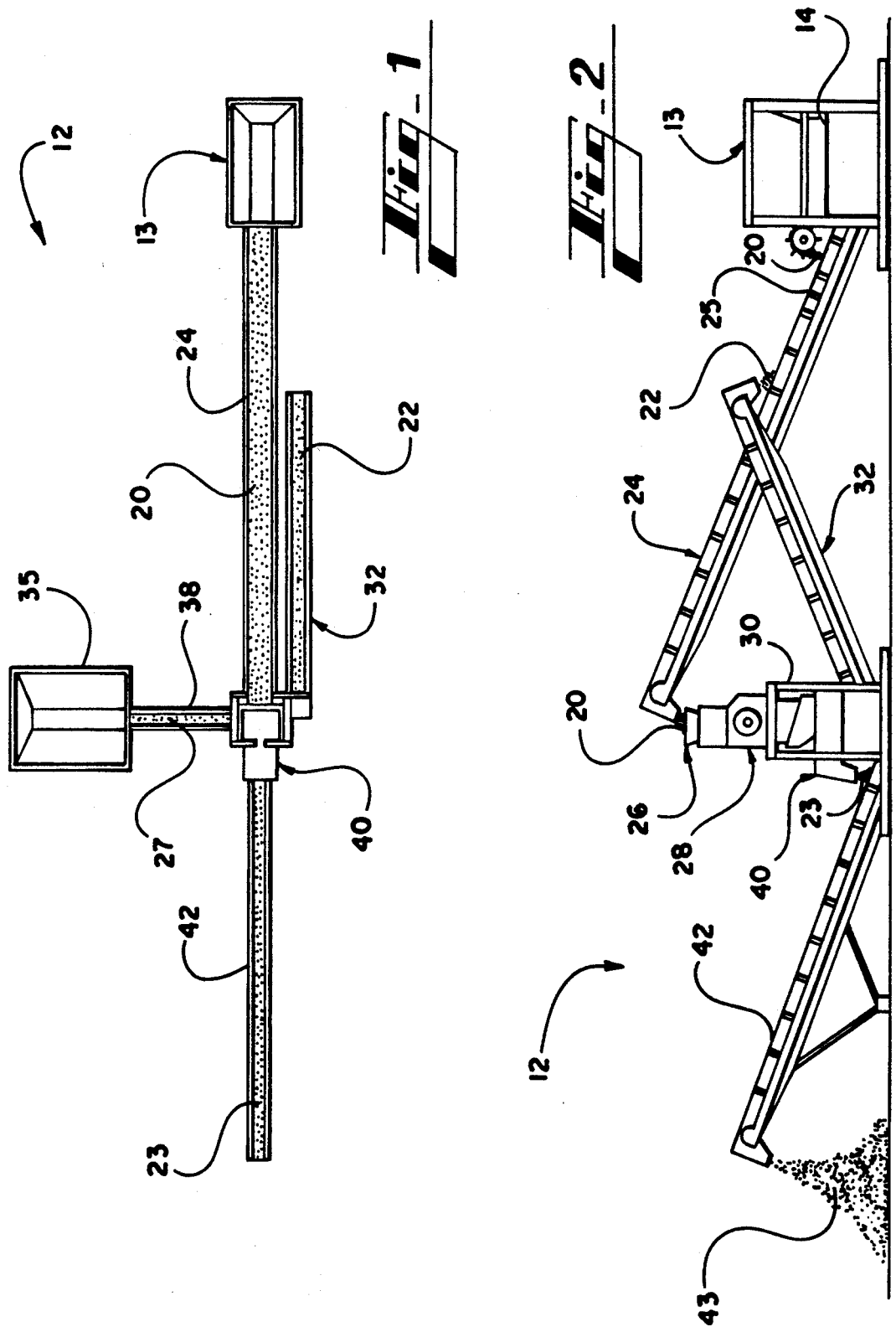

METHOD FOR PREPARING AND STORING A RECYCLABLE SHINGLE MATERIAL

This is a continuation of application Ser. No. 07/737,056 filed on Jul. 29, 1991 now abandoned, which is a division of application Ser. No. 07/606,892 filed on Oct. 1, 1990, abandoned.

TECHNICAL FIELD

This invention relates generally to the recycling of asphaltic roofing shingles, and relates more specifically to a method and apparatus for preparing asphaltic roofing shingles to form a recycable asphalt material which may be easily stored, transported, and later used as a component of an asphalt paving composition.

BACKGROUND ART

It is known in the art to use old and scrap roofing shingles in the manufacture of asphaltic paving composition. One such method is disclosed in U.S. Pat. No. 4,706,893. In this and other methods, it is necessary that the shingles be shredded or otherwise reduced in size so that they can be more accurately weighed and metered.

The '893 patent discloses a method and apparatus for recycling asphalt shingles in an asphalt plant which combines virgin aggregate with liquid asphalt to form an asphalt paving composition. The shingles are comminuted into particles and the shingle particles are introduced into the asphalt plant such that they are heated to melt the asphalt in the shingle particles. The virgin aggregate, shingle particles, and liquid asphalt are thoroughly mixed to form an asphalt paving composition.

It is appreciated in the '893 patent that the shingles tend to stick together in a pile, which can lead to problems during processing. Col. 4, lines 53–62. However, experience has shown that merely comminuting the shingles into particles does not effectively reduce the tendency of the particles to stick together as was believed, Col. 5, lines 16–25, unless the particles are used shortly after the shredding process.

In shredding the shingles, because of economic concerns, it is desirable to shred the shingles in large batches at a central location, rather than to shred shingles at individual asphalt paving production plants, with the shredding often occurring at a location remote from the recycling plant. Because of this, the shredded shingles may sit in piles for an extended period of time and are often shipped in mass quantities. In storage and during shipment, the individual particles tend to stick or clump together due to the adhesive properties of the asphalt contained in the shingle particles. Thus, unless used soon after being shredded and without extensive transportation, the shredded shingles become difficult to stockpile, transport and use due to their tendency to clump or stick together. Therefore, a need exists in the art for a method of preparing shredded shingles so that they resist sticking or clumping together.

SUMMARY OF THE INVENTION

As will be seen, the present invention overcomes the above described problems. Stated generally, the present invention comprises an apparatus and method for treating asphalt roofing shingles to form a recyclable asphaltic material which may be easily stored and transported. To accomplish this, shredded roofing shingles are mixed with a carrier aggregate to form a recyclable asphaltic material.

According to the present invention there is provided an apparatus for preparing a recyclable asphaltic material comprising a shredder for comminuting asphalt roofing shingles and a means for combining carrier aggregate with the comminuted shingles.

Another aspect of the present invention provides a recyclable asphaltic material which may be easily stored and transported, comprising between about 50% and about 85% by weight of the recyclable material of comminuted asphalt roofing shingle particles and between about 15% and about 50% by weight of the recyclable material of a carrier aggregate for substantially preventing the shingles particles from sticking together.

According to another aspect of the present invention there is provided a method for manufacturing asphalt paving composition having a predetermined proportion by weight of asphalt, comprising the steps of: combining a measured amount of recyclable asphaltic material and a measured amount of heated virgin aggregate to form a mixture, the recyclable asphaltic material comprising roofing shingles having an approximately known percentage by weight of asphalt comminuted to particles of a size which can be accurately flowed and metered, and between about 15% and 50% by weight of a carrier aggregate, the carrier aggregate having been mixed at ambient temperature with the shingle particles; calculating the amount of asphalt in the mixture based upon the measured amount of recyclable asphaltic material and the approximately known proportion by weight of asphalt in the recyclable asphaltic material; introducing a controlled amount of liquid asphalt into the mixture such that the amount of total asphalt in the mixture from the recyclable asphaltic material and the liquid asphalt constitutes the predetermined proportion; and mixing the heated virgin aggregate, the recyclable asphaltic material, and the liquid asphalt to form an asphalt paving composition.

Thus, it is an object of the present invention to provide a method and apparatus for combining a carrier aggregate with comminuted roofing shingle particles such that the particles resist adhering to one another.

It is a further object of the present invention to provide a method and apparatus for treating asphalt roofing shingles to form a recyclable asphalt material which may be easily stored and transported.

It is another object of the present invention to provide a method and apparatus to enable roofing singles to be effectively stored and transported prior to later use in preparation of a paving composition.

It is another object of the present invention to provide a method and apparatus for preparing asphalt roofing shingles so that they may be better mixed in an asphalt plant.

It is a further object of the present invention to provide an improved method and apparatus for producing paving composition.

Other objects, features, and advantages of the present invention will become apparent upon reading the following specification when taken in conjunction with the drawings and appended claims.

BRIEF DESCRIPTION OF THE DRAWING

FIG. 1 is a top plan view of a shingle processing apparatus according to a preferred embodiment of the present invention.

FIG. 2 is a schematic diagram of the shingle processing apparatus of FIG. 1.

DESCRIPTION OF THE DISCLOSED EMBODIMENT

Figure 3:
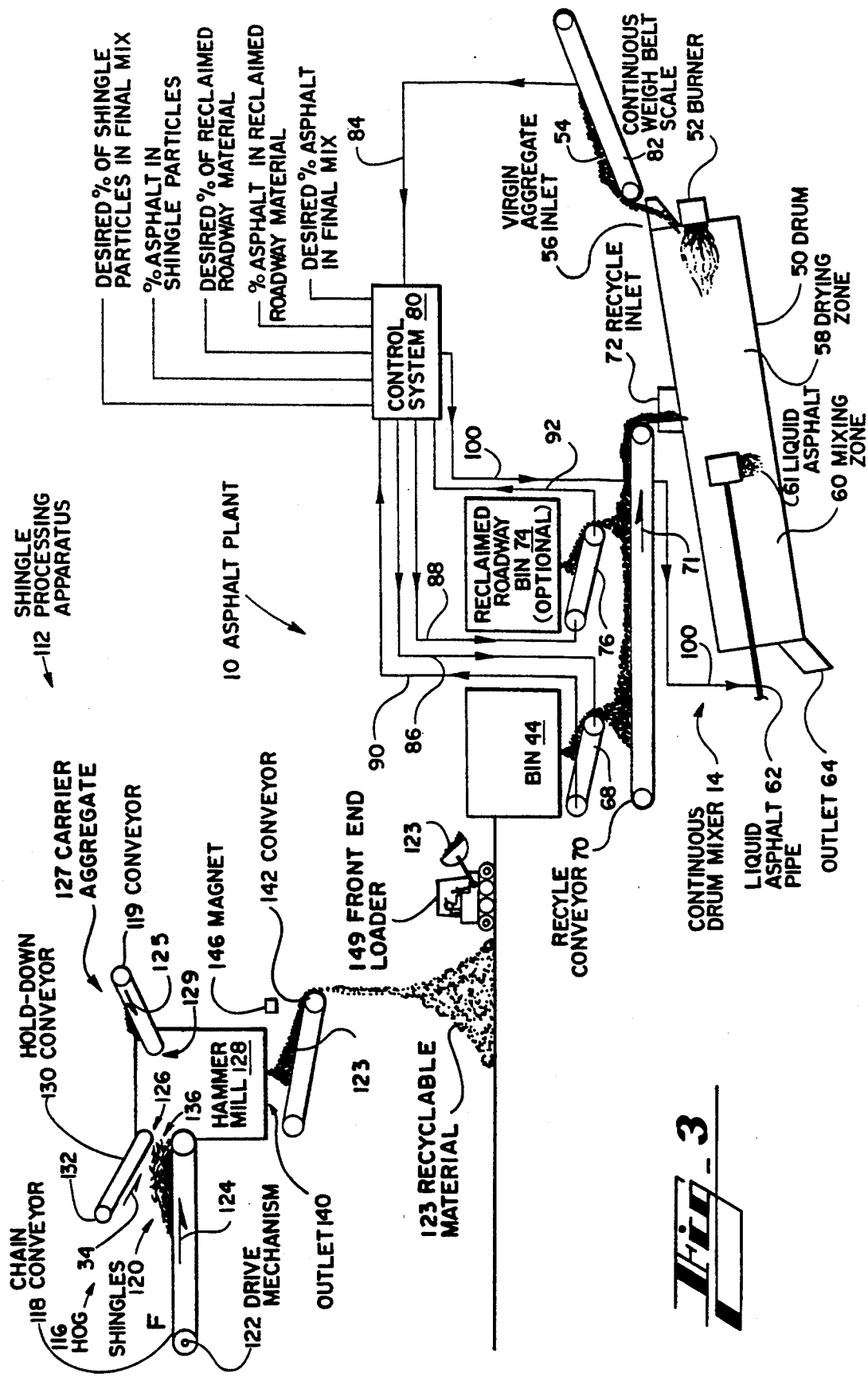
FIG. 3 is a schematic diagram of an alternate embodiment of a shingle processing apparatus and an asphalt plant according to the present invention.

The present invention provides a method and apparatus for producing a recyclable asphaltic material which may be easily stored and transported. The present invention additionally provides a method and apparatus for producing a recyclable asphaltic material which may be recycled into an asphalt-aggregate paving composition in accordance with the method and apparatus disclosed in U.S. Pat. No. 4,706,893, which is incorporated by reference herein in its entirety.

FIGS. 1 and 2 show the preferred embodiment of a shingle processing apparatus 12. In this apparatus, shingles 20 are fed from a bin 13, having a variable rate feeder 14, by a conveyor 24 over a belt scale 25 into an inlet chute 26. The inlet chute funnels the shingles into a shredder mill 28. The shredder mill 28, which may be, for example, a Telsmith shredder, comminutes the shingles 20 into particles preferably having a size of no greater than about one-half inch. The comminuted shingles exit the shredder mill 28 and feed onto a screen 30. Oversize shingle particles 22 having a size greater than about one-half inch are discharged from the screen 30 to a conveyor 32. The conveyor 32 returns these oversize shingle particles to the conveyor 24 for re-feeding to the shredder mill 28. Shingle particles having a size of about one-half inch or less (one-half inch minus) pass through the screen 30 and feed into a pugmill 40 for mixing with a carrier aggregate 27 to form a recyclable material 23 which resists sticking or clumping together. Carrier aggregate in an amount of between 15% and 50% by weight of the final composition of the recyclable material 23 is fed from a bin 35 by a conveyor 38 into the pugmill 40 for mixing with the comminuted shingle particles which are fed into the pugmill. The conveyor 38 may also be equipped with a belt scale (not shown). The belt scales are utilized in a well known manner to regulate the proportions of shingle material and aggregate 27 admitted to the pugmill 40. The carrier aggregate 27 is preferably either sand having a diameter of no more than about one-eighth inch (one-eighth inch minus) or limestone screenings having a diameter of no more than about three-eighth inch (three-eighth inch minus). The shingle particles and the carrier aggregate are preferably mixed at ambient temperature. They preferably should not be mixed at a temperature so high as to cause the asphalt in the shingle particles to melt and run. The recyclable material 23 formed by mixing the shingle particles and the carrier aggregate 27 exits the pugmill 40 onto a radial stack conveyor 42. The conveyor 42 carries the recyclable material 23 away from the shingle processing apparatus 12 and deposits it to form large piles 43 of recyclable material. The piled recyclable material may then be treated and used in a manner similar to reclaimed roadway material.

It will be understood that the primary feature of the present invention is to provide a method and apparatus for producing an asphaltic material which may be easily stored and transported. However, it will further be understood that a secondary feature of the present invention is to provide a method and apparatus for producing an asphaltic material which can be used to make hot mix asphalt. Accordingly, FIG. 3 shows an alternate embodiment of a shingle processing apparatus 112 which is located for providing a recyclable asphaltic material 123 to an asphalt plant 10. In the prior art as disclosed in the '893 patent, asphalt shingles are shredded into particles. These particles are then fed into an area of a drum 50 which has a temperature high enough to melt the asphalt but not so high as to cause excessive smoking. Heated virgin aggregate 54 is introduced at the same time as the shingle particles. Following this, additional liquid asphalt 61 is added to bring the total asphalt content of the mixture to the desired level, and the virgin aggregate 54, shingle particles, and liquid asphalt 61 are thoroughly mixed. Because this method is shown in U.S. Pat. No. 4,706,893, only the particular details of the process as modified by this invention are discussed herein.

The shingle processing apparatus 112 includes a hog 116 of the type commonly found in the wood processing industry. The hog 116 includes a chain conveyor 118 onto which shingles 120 are fed. The chain conveyor 118 is driven by a conventional drive mechanism 122 to move in the direction indicated by the arrow 124 to carry the shingles 120 to a first inlet 126 of a hammer mill 128. The shingles 120 are first comminuted using the hammer mill 128. A carrier aggregate 127 in an amount between about 15% and 50% by weight of the final composition of the recyclable material 123 is fed into the hammer mill 128 along with the shingles 120. Thus, the shingles 120 are comminuted and mixed with the carrier aggregate 127 to form a recyclable asphalt material 123 which resists sticking or clumping together to form large lumps or agglomerates. The carrier aggregate 127 is delivered to the shredder 128 by a chain conveyor 119 driven by a conventional drive mechanism to move in the direction indicated by the arrow 125 to carry the carrier aggregate into a second inlet 129 of the hammer mill 128. Alternately, the carrier aggregate could be placed on the conveyor 118 and fed into the shredder 128 with the shingles. It will be understood, however, that the carrier aggregate 127 may be added after the shingles 120 have been shredded, and mixed in an appropriate conventional mixing apparatus. It will also be understood that any conventional loading apparatus such as a front end loader or conveyor belt may be used to introduce the carrier aggregate 127 onto one of the conveyors 118 or 119, or into such a conventional mixing apparatus.

FIG. 3 shows the recyclable material 123 being withdrawn from the hammer mill 128 through an outlet 140 in the bottom of the mill 128 and onto a conveyor 142. A magnet 146 above the conveyor 142 removes nails and other scrap metal from the recyclable material. The material 123 may then be piled upon the ground and may be loaded into a storage bin 44 on an as needed basis using a truck or front end loader 149. Optionally, the material 123 could also be conveyed directly to the storage bin 44. Recyclable material may be taken from bin 44 on an as needed basis for use in the asphalt plant 10.

As is also shown in FIG. 3, recyclable material of the present invention may be recycled into an asphalt-aggregate product, such as asphalt paving composition as described in U.S. Pat. No. 4,706,893, because the amount of aggregate and asphalt in the recyclable material are known quantities.

The components of the asphalt plant 10 are as follows. The continuous drum mixer 14 is of the type well known to those skilled in the art and will be described herein only briefly. A drum 50 is mounted for rotation about its longitudinal axis and has a burner 52 mounted in its upper end. Virgin aggregate 54 is introduced through an inlet 56 in the upper end of the drum 50. Flights (not shown) on the interior of the drum tumble the aggregate through a flow of heated air in a drying zone 58 of the drum as the drum rotates.

Farther down the drum in a mixing zone 60 removed from the high temperatures proximate to the burner 52, liquid asphalt 61 is introduced into the drum through a pipe 62. By introducing the liquid asphalt into the drum 50 at a point removed from the intense heat of the burner 52, heavy smoking from the liquid asphalt is eliminated. The contents of the drum are thoroughly mixed by tumbling through the mixing zone 60 and are withdrawn through an outlet 64 in the lower end of drum in the manner well known to those skilled in the art.

Recyclable material 123 is metered from the bin 44 by a continuous-weigh belt scale 68. The belt scale 68 feeds the continuous weight recyclable material 123 onto a recycle conveyor 70, by which the material 123 is carried in the direction indicated by the arrow 71 to a recycle inlet 72. The recyclable shingle material is introduced through the recycle inlet 72 into the interior of the drum 50 at the lower portion of the drying zone 58. If desired, reclaimed roadway material can be metered from a bin 74 by another continuous-weigh belt scale 76 onto the recycle conveyor 70, where it is introduced along with the recyclable material 123 through the recycle inlet 72 into the interior of the drum 50.

A control system 80 controls the rates at which recyclable material 123, reclaimed roadway material, and liquid asphalt are introduced into the interior of the drum 50 to maintain the proper proportions between the various elements which comprise the final mix. The control system 80 is preferably a microprocessor programmable by one skilled in the art when the control functions of the present invention are provided. The desired percentage of recyclable material 123 in the final mix, the percentage of asphalt and carrier aggregate in the recyclable material, and the desired proportion of asphalt in the final mix are entered into the control system manually. A continuous-weight belt scale 82 measures the rate at which virgin aggregate 54 is being fed into the drum and sends a signal 84 to the control system 80. Responsive to the signal 84, the control system sends a signal 86 to the belt scale 68 to control the rate at which recyclable material is fed from the bin 44 onto the recycle conveyor 70 in order to maintain a constant proportion to the virgin aggregate 54.

If reclaimed roadway material is being recycled, the desired percentage of reclaimed roadway material in the final mix and the percentage of asphalt in the reclaimed roadway material are also manually entered into the control system 80. The control system further sends a signal 88 to the belt scale 76 to control the rate at which reclaimed roadway material is being fed from the reclaimed roadway bin 74 onto the recycle conveyor 70, again maintaining a constant proportion to the virgin aggregate.

Since both the recyclable material and the reclaimed roadway material contain asphalt, the amount of liquid asphalt introduced into the drum must be adjusted accordingly so that the final asphalt product will have the desired asphalt content. Accordingly, signals 90 and 92 from the continuous-weigh belt scales 68, 76 are sent to the control system 80. Appropriately programmed conventional microprocessors, knowing the percentage of recyclable material in the mix and the percentage of asphalt and carrier aggregate in the recyclable material, can compute the percentage of asphalt added to the mix by way of the recyclable material. Similarly, if reclaimed roadway material is being recycled, the control system 80 can calculate the percentage of asphalt added to the final mix from the recycled roadway material, based upon the percentage of the mix comprised by reclaimed roadway material and the percentage of asphalt in the reclaimed roadway material. With the percentage of asphalt and aggregate from these two sources known, and with the desired percentage of asphalt and aggregate in the final product known, the control system 80 sends a signal 100 to control the rate at which liquid asphalt is introduced into the drum to bring the total asphalt content of the composition to the desired level. Apparatus for controlling the rate at which liquid asphalt is introduced into the drum are well known in the art.

The recyclable material of the present invention has many advantages over plain comminuted shingles. The material of the present invention may be mass produced at a remote location, as shown in FIGS. 1 and 2, and shipped to a recycling plant and stored for long periods of time without adverse effects on the flowability of the material. Plain comminuted shingles must be used relatively quickly after being shredded, thus necessitating a costly shredding apparatus at each plant. In addition, the recyclable material of the present invention provides a material which is easier to handle than plain comminuted shingles, because the carrier aggregate acts to prevent the recyclable shingle material from sticking together. Because of this feature, the material offers increased ease of handling, reduced frictional resistance, and superior mixing characteristics without detracting from the recyclable properties of the shingles.

Accordingly, because the carrier aggregate contributes the identical properties to the end asphalt paving product as does the virgin aggregate, no additional costs are attributable to the carrier aggregate. In fact, little if any additional costs are attributable to the carrier aggregate. In fact, little if any additional equipment is required to mix the carrier aggregate with the recyclable shingle material. And the cost of such mixing, if any, is far offset by the savings attributable to the ability to have a centralized shingle processing center and to the superior mixing properties of the material.

Having described a preferred embodiment of the invention, it will be understood that modifications and alterations may be made without departing from the scope of the invention as described and as defined in the following claims.

I claim:

1. A method for preparing a recyclable asphaltic material, comprising the steps of:
   comminuting roofing shingles to particles of a size which can be accurately flowed and metered;
   preventing said shingle particles from significantly sticking together by mixing said particles with a carrier aggregate at a temperature below the melting point of asphalt; and
   maintaining said mixture at a temperature below the melting point of asphalt for a period of storage.

2. The method of claim 1, wherein mixing said particles with the carrier aggregate comprises mixing said particles with between about 15% and about 50% of said carrier aggregate by weight of the recyclable material.

3. The method of claim 1, wherein said particles and carrier aggregate are mixed at ambient temperature.

4. The method of claim 1, wherein said shingles are comminuted into particles using a shredder and the carrier aggregate is mixed with the particles by feeding the carrier aggregate into said shredder.

5. The method of claim 1, wherein said shingles are comminuted into particles using a shredder and the carrier aggregate is mixed with the particles after they exit said shredder.

6. The method of claim 1, wherein said shingle particles have a diameter no greater than about ½ inch.

7. The method of claim 6, wherein said carrier aggregate comprise particles having a diameter no greater than about ⅜ inch.

8. The method of claim 1, wherein said carrier aggregate is selected from the group consisting of sand having a diameter of no greater than about ⅛ inch and limestone screenings having a diameter of no greater than about ⅜ inch.

9. A method for preparing and storing a recyclable asphaltic shingle material, comprising the steps of:

comminuting roofing shingles at ambient temperature to particles which can be accurately flowed and metered;

mixing said shingle particles with a carrier aggregate at ambient temperature to form a mixture in which said shingle particles resist adhering to one another, and maintaining said mixture at ambient temperature in a flowable state for a period of storage.

10. A method for preparing and storing a recyclable asphaltic shingle material, comprising the steps of:

comminuting roofing shingles to particles which can be accurately flowed and metered;

screening said shingle particles into a mixer;

mixing said shingle particles with a carrier aggregate in said mixer at a temperature below the melting point of asphalt to form a mixture in which said shingle particle resist adhering to one another; and maintaining said mixture at a temperature below the melting point of asphalt in a flowable state for a period of storage.

* * * * *